(12) United States Patent
Beaurepaire et al.

(10) Patent No.: US 12,429,346 B2
(45) Date of Patent: Sep. 30, 2025

(54) METHOD TO SUPPORT LOW-PROFILE VEHICLES

(71) Applicant: HERE GLOBAL B.V., Eindhoven (NL)

(72) Inventors: Jerome Beaurepaire, Nantes (FR); Leon Stenneth, Chicago, IL (US); Jeremy Michael Young, Beverly Hills, MI (US)

(73) Assignee: HERE GLOBAL B.V., Eindhoven (NL)

( * ) Notice: Subject to any disclaimer, the term of this patent is extended or adjusted under 35 U.S.C. 154(b) by 113 days.

(21) Appl. No.: 18/544,492

(22) Filed: Dec. 19, 2023

(65) Prior Publication Data

US 2025/0198772 A1    Jun. 19, 2025

(51) Int. Cl.
*G01C 21/34* (2006.01)
*G07C 5/02* (2006.01)

(52) U.S. Cl.
CPC .......... *G01C 21/3461* (2013.01); *G07C 5/02* (2013.01)

(58) Field of Classification Search
CPC ............................ G01C 21/3461; G07C 5/02
See application file for complete search history.

(56) References Cited

U.S. PATENT DOCUMENTS

| | | | |
|---|---|---|---|
| 7,202,776 B2* | 4/2007 | Breed | B60W 30/16 340/557 |
| 8,467,932 B2* | 6/2013 | Nielsen | G06Q 10/087 340/576 |
| 9,514,651 B2 | 12/2016 | Linder et al. | |
| 9,766,625 B2 | 9/2017 | Boroditsky et al. | |

(Continued)

FOREIGN PATENT DOCUMENTS

CN    201892744 U    7/2011

OTHER PUBLICATIONS

Yao et al., "Road curb detection using 3D lidar and integral laser points for intelligent vehicles," The 6th International Conference on Soft Computing and Intelligent Systems, and The 13th International Symposium on Advanced Intelligence Systems, Nov. 20-24, 2012, pp. 100-105, Webpage available at : https://ieeexplore.ieee.org/abstract/document/6505310/authors#authors.

(Continued)

*Primary Examiner* — Gertrude Arthur Jeanglaude
(74) *Attorney, Agent, or Firm* — Jeffrey R. Moisan; HERE GLOBAL B.V.

(57) ABSTRACT

A system to assist an owner of a low-profile vehicle to avoid damages related to vehicle impact upon a raised feature of a road is disclosed. The system may be configured to obtain one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact. The locations may be map-matched to map locations. The system may cluster the map-matched locations and automatically predict, using a trained machine learning model trained on ground truth of a region, potential locations of vehicle impact relevant to the owner of the low-profile vehicle.

20 Claims, 4 Drawing Sheets

(56) References Cited

U.S. PATENT DOCUMENTS

| | | |
|---|---|---|
| 9,886,636 B2 | 2/2018 | Zhang et al. |
| 9,944,317 B2 | 4/2018 | Lee |
| 10,486,485 B1 | 11/2019 | Levinson et al. |
| 10,745,003 B2 | 8/2020 | Kentley-Klay et al. |
| 10,816,993 B1 * | 10/2020 | Tran ................... G05D 1/0246 |
| 10,853,670 B2 | 12/2020 | Sholingar et al. |
| 10,860,015 B2 * | 12/2020 | Ferguson ............ G05D 1/2247 |
| 11,348,269 B1 * | 5/2022 | Ebrahimi Afrouzi ... G01S 17/48 |
| 2020/0262417 A1 | 8/2020 | Hüger |

OTHER PUBLICATIONS

"IEEE 802.11" Wikipedia, Retrieved on Nov. 20, 2023, Webpage available at https://en.wikipedia.org/wiki/IEEE_802.11.

"IEEE 802.16" Wikipedia, Retrieved on Nov. 20, 2023, Webpage available at https://en.wikipedia.org/wiki/IEEE_802.16.

"IMT-2020" Wikipedia, Retrieved on Nov. 30, 2023, Webpage available at https://en.wikipedia.org/wiki/IMT-2020#:~:text= International%20Mobile%20Telecommunications%2D2020% 20(IMT,as%20Recommendation%20ITU%2DR%20M.

* cited by examiner

METHOD TO SUPPORT LOW-PROFILE VEHICLES

TECHNOLOGICAL FIELD

An example aspect of the present disclosure generally relates to vehicle clearance assistance, and more particularly, but without limitation relates to a system, a method, and a computer program product for that allows low profile vehicles owners to safely drive and park their vehicles by warning them of dangerous curbs or speed bumps detected by sensors.

BACKGROUND

Low-profile vehicles, such as certain sports cars (sometimes referred to as "super cars") have low ground clearance, typically by design for aerodynamic and traction improvement. The low-profile, low ground clearance aspects of such vehicles exposes them to damage from raised features on or near roads, such as speed bumps, speed humps, speed tables and other such speed regulation features encountered on the road. While a driver or AV may be aware of raised features in their immediate view or from past experience, often the driver or AV may not have advanced notice to avoid impact with the raised feature when going over the feature or approaching it. Substantial damage to the undercarriage, bumpers and other low-hanging accessories may occur from vehicle impact.

BRIEF SUMMARY

The present disclosure provides a system, a method and a computer program product to determine a personalized planning recommendation based on weather data, in accordance with various aspects.

Aspects of the disclosure provide a system to assist an owner of a low-profile vehicle to avoid damages related to vehicle impact upon a raised feature of a road. The system may include: at least one memory configured to store computer executable instructions; and at least one processor configured to execute the computer executable instructions to: obtain one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact; match the one or more locations related to the first location bucket and the second location bucket to one or more map locations; cluster the one or more matched locations using DB-SCAN clustering of the first location bucket and the second location bucket to remove noise associated with the one or more matched locations and to determine an actual location of the raised feature given a plurality of impacts around a same location; and automatically predict, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

Aspects of the disclosure provide a computer-implemented method to assist an owner of a low-profile vehicle to avoid damages related to vehicle impact upon a raised feature of a road. The method may include: obtaining one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact; matching the one or more locations related to the first location bucket and the second location bucket to one or more map locations; clustering the one or more matched locations using DB-SCAN clustering of the first location bucket and the second location bucket to remove noise associated with the one or more matched locations and to determine an actual location of the raised feature given a plurality of impacts around a same location; and automatically predicting, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

Aspects of the disclosure provide a computer program product. The computer program product may include a non-transitory computer readable medium having stored thereon computer executable instructions, which when executed by one or more processors, cause the one or more processors to carry out operations to assist an owner of a low-profile vehicle to avoid damages related to vehicle impact upon a raised feature of a road, the operations comprising: obtaining one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact; matching the one or more locations related to the first location bucket and the second location bucket to one or more map locations; clustering the one or more matched locations using DB-SCAN clustering of the first location bucket and the second location bucket to remove noise associated with the one or more matched locations and to determine an actual location of the raised feature given a plurality of impacts around a same location; and automatically predicting, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

The foregoing summary is illustrative only and is not intended to be in any way limiting. In addition to the illustrative aspects, aspects, and features described above, further aspects, aspects, and features will become apparent by reference to the drawings and the following detailed description.

BRIEF DESCRIPTION OF THE DRAWINGS

Figure 1:
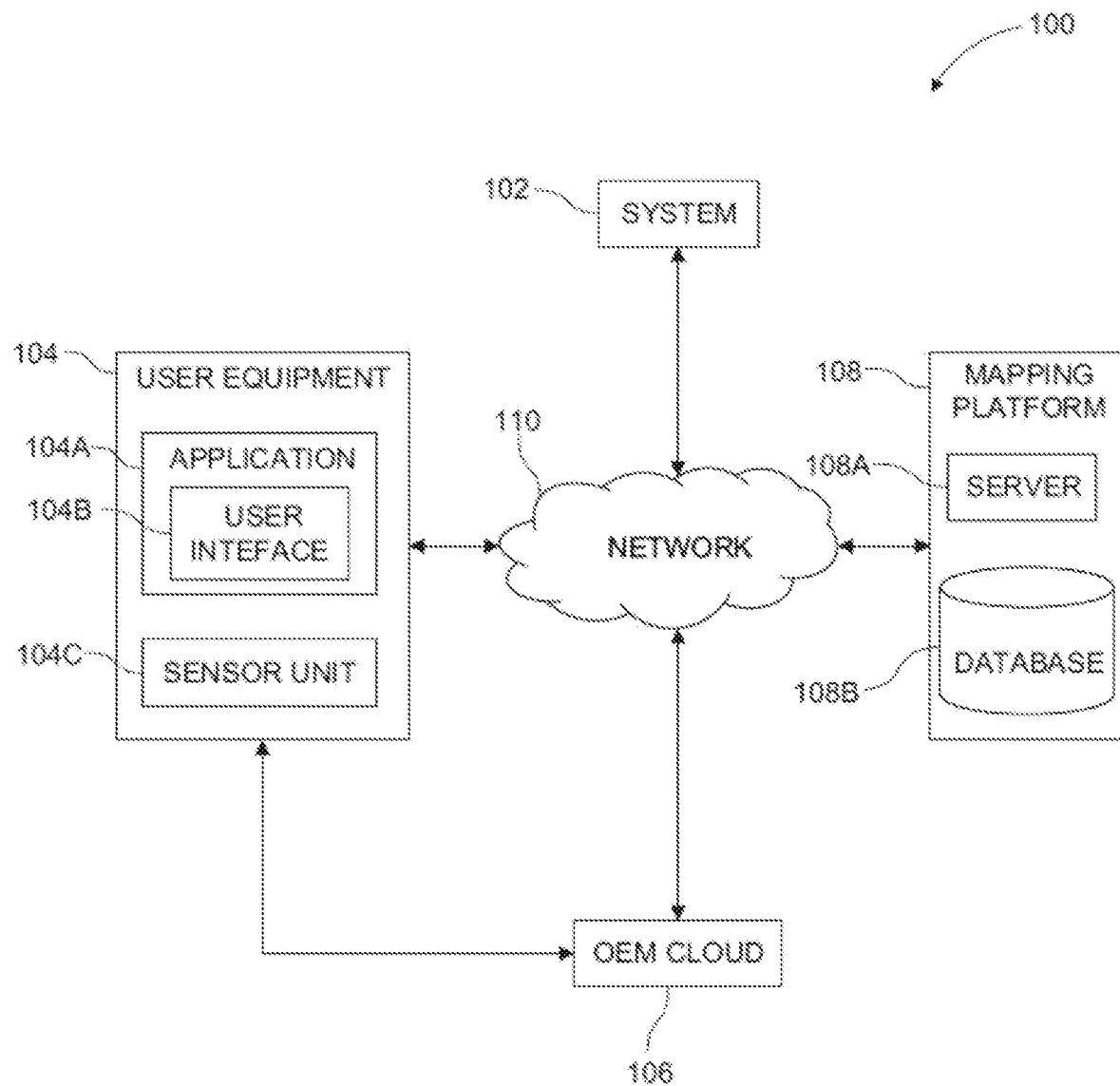
Figure 2:
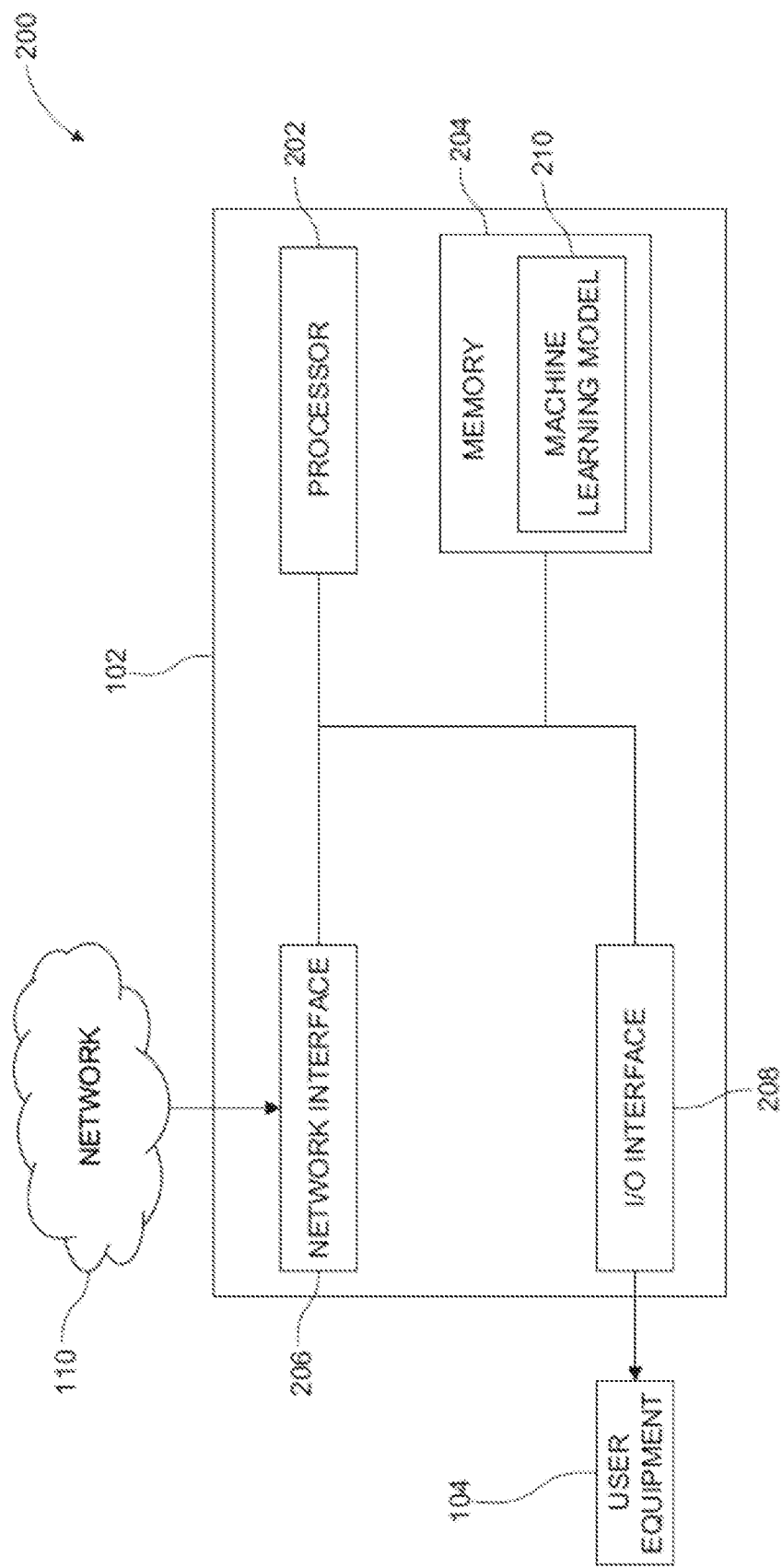
Figure 3:
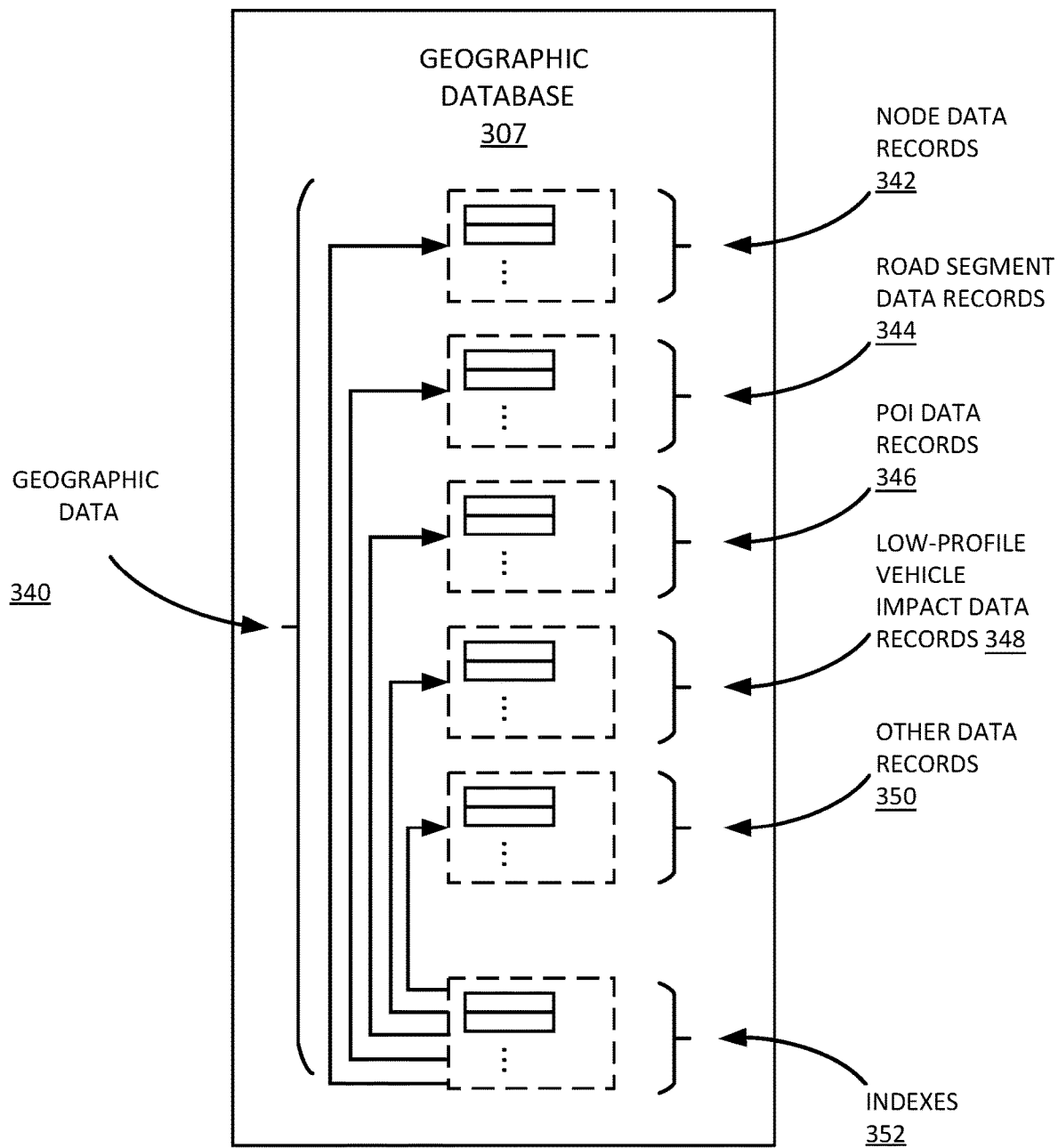
Figure 4:
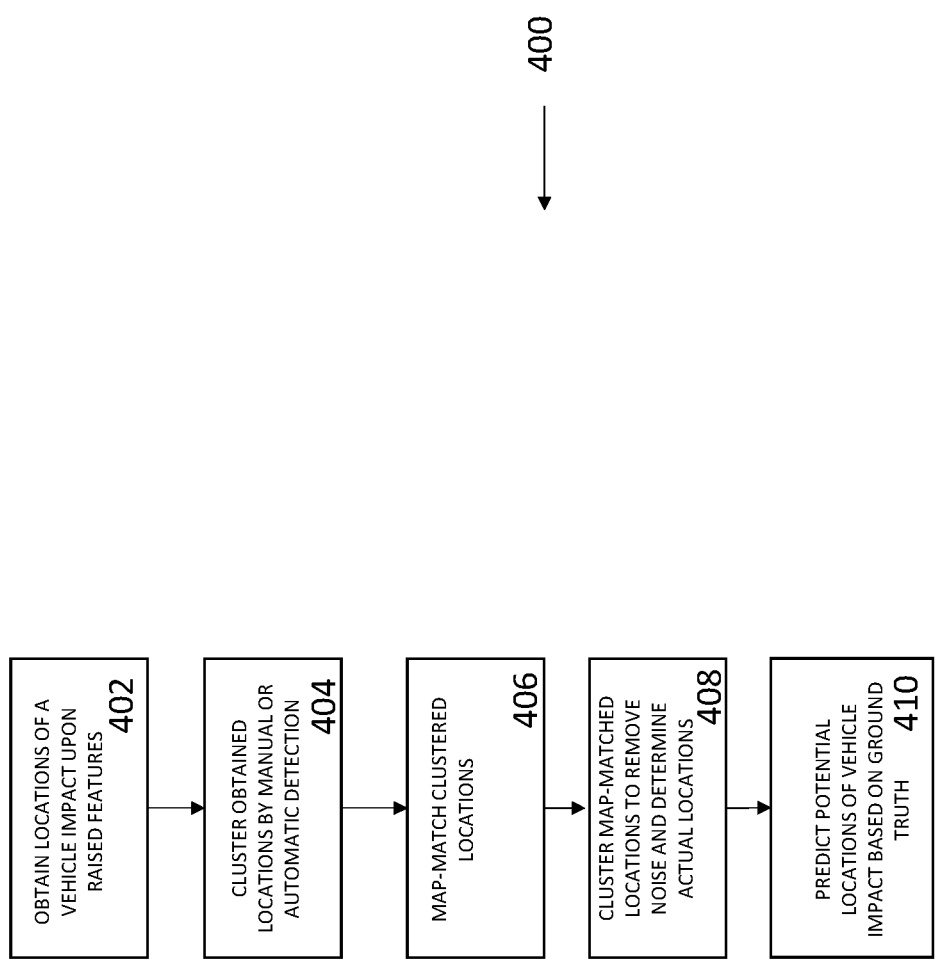

Having thus described certain aspects of the disclosure in general terms, reference will now be made to the accompanying drawings, which are not necessarily drawn to scale, and wherein:

FIG. 1 illustrates a schematic diagram of a network environment 100 of a system 102 for assisting an owner of a low-profile vehicle to avoid damages related to vehicle impact upon a raised feature of a road in accordance with an example aspect;

FIG. 2 illustrates a block diagram of the system for assisting an owner of a low-profile vehicle to avoid damages related to vehicle impact upon a raised feature of a road, in accordance with an example aspect;

FIG. 3 illustrates an example the map or geographic database for use by the system for assisting an owner of a low-profile vehicle to avoid damages related to vehicle impact upon a raised feature of a road, in accordance with an example aspect; and FIG. 4 illustrates a flowchart 400 for acts taken in an exemplary method for assisting an owner of a low-profile vehicle to avoid damages related to vehicle impact upon a raised feature of a road, in accordance with an aspect.

DETAILED DESCRIPTION

Some aspects of the present disclosure will now be described more fully hereinafter with reference to the accompanying drawings, in which some, but not all, aspects are shown. Indeed, various aspects may be embodied in many different forms and should not be construed as limited to the aspects set forth herein; rather, these aspects are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with aspects of the present disclosure. Thus, use of any such terms should not be taken to limit the spirit and scope of aspects of the present disclosure.

For purposes of this disclosure, though not limiting or exhaustive, "vehicle" refers to standard gasoline powered vehicles, hybrid vehicles, an electric vehicle, a fuel cell vehicle, and/or any other mobility implement type of vehicle (e.g., bikes, scooters, etc.). The vehicle includes parts related to mobility, such as a powertrain with an engine, a transmission, a suspension, a driveshaft, and/or wheels, etc. The vehicle may be a non-autonomous vehicle or an autonomous vehicle. The term autonomous vehicle (AV) may refer to a self-driving or driverless mode in which no passengers are required to be on board to operate the vehicle. An autonomous vehicle may be referred to as a robot vehicle or an automated vehicle. The autonomous vehicle may include passengers, but no driver is necessary. These autonomous vehicles may park themselves or move cargo between locations without a human operator. Autonomous vehicles may include multiple modes and transition between the modes. The autonomous vehicle may steer, brake, or accelerate the vehicle based on the position of the vehicle in order, and may respond to lane marking indicators (lane marking type, lane marking intensity, lane marking color, lane marking offset, lane marking width, or other characteristics) and driving commands or navigation commands. In one aspect, the vehicle may be assigned with an autonomous level. An autonomous level of a vehicle can be a Level 0 autonomous level that corresponds to a negligible automation for the vehicle, a Level 1 autonomous level that corresponds to a certain degree of driver assistance for the vehicle, a Level 2 autonomous level that corresponds to partial automation for the vehicle, a Level 3 autonomous level that corresponds to conditional automation for the vehicle, a Level 4 autonomous level that corresponds to high automation for the vehicle, a Level 5 autonomous level that corresponds to full automation for the vehicle, and/or another sub-level associated with a degree of autonomous driving for the vehicle.

Many low profile vehicle owners fear touching the curbs when parking, which can lead to large damages on their expensive vehicles. There is a need to avoid this kind of problem by leveraging modern sensing technologies and learning capabilities.

Conventionally, among "supercars," (one example of a low-profile vehicle) almost all of them have low ground clearance. For example, compare the ground clearance of the Aston Martin Vantage, one of the supercars with the best clearance with the clearance of the average sedan. The clearance of the Aston Martin Vantage is 6.2 inches, which is still lower than the ground clearance of the average SUV that is around 7 inches. Supercars have a low ground clearance for various reasons. First, low ground clearance allows the car to hug the ground and decreases the risk of toppling, especially when turning tight corners at high speed. More importantly, it improves the car's aerodynamic qualities, reducing the air resistance the vehicle has to overcome (this is partly why supercars put up amazing speeds). However, low ground clearance also puts an expensive low-profile vehicle at risk. The design exposes the car to scrapes, dents, and scratches, especially when driving over obstacles such as road bumps and potholes. Shredded bumpers, smashed oil pans, and damaged suspensions are problems you will probably face as the owner of a ground-hugging supercar. There are various raised features of a road that may cause damage to a low-profile vehicle upon impact with the raised feature.

Speed Bumps

According to many online sources and federal laws, the average height of speed bumps is between 2-4 inches.

Some may be higher, though, as official dimensions vary across states. This is because there is no central body regulating the height of speed bumps. Instead, local municipalities select measurements they believe to be appropriate. The type of speed bump used can also determine the height. There are many variations of the speed bump. There is the standard speed bump, speed hump, speed table, and speed cushion, all of which have varying heights. Standard speed bumps are designed to "aggressively" limit the speed of cars (they can reduce the speed of a car to 5-10 mph). It is used mostly in areas where pedestrians and vehicles share space: areas such as parking lots and driveways. The average height of speed bumps is 3-6 inches, but this number largely depends on the decision of local authorities.

Speed Humps

Speed humps are the preferred option for inner-city routes where excessive speed can endanger people around. School zones, business districts, etc. are examples of places where you will find speed humps. Speed humps differ from speed bumps because they are wider. In addition, they do not bring oncoming cars to a near-halt as speed bumps do (they limit vehicle speed to around 10-15 mph). Most speed humps are within the range of 3-4 inches.

Speed Tables

Speed tables are flat-topped humps, which raise the wheelbase of a car to reduce its speed. Speed tables do not slow down cars the way speed humps and speed bumps do. Hence, you will find them in areas where normal speed limits apply (transit areas, for example). The average height for a speed table is 3-3.5 inches.

Per city regulations and guidelines given by traffic control bodies like the Federal Highway Administration, the maximum height for a speed hump is 4 inches. That is a problem if a driver intends to drive a Lamborghini (i.e, a low-profile vehicle) around the city. To drive over a typical city speed hump, a supercar, low-profile vehicle, will need at least 4.5-5 inches of ground clearance. Anything lesser than that will put components located under the car's hood in danger of serious damage.

The situation may become more problematic if one lives in a private residential area where speed bumps are used instead of humps. On average, speed bumps in such areas can be up to six inches high, provided local authorities approve. In places like this, any vehicle with clearance lesser than 6.5 inches or above will not do.

The goal of the disclosed system is to use sensor data and mapping technology to extract information about the driver's low-profile vehicle and record impacts with raised features on the road, allowing prediction of locations where such is possible.

One aspect of the disclosure is detection of locations of vehicle impacts with raised features on a road.

One aspect provides the ability to manually detect impact, where, in an aspect, each time that the impact is detected and a driver is onboard, the driver makes a record (e.g. pressing a button) on mobile device. Another aspect is to automatically record the impact—the vehicle automatically detects the impact using onboard sensors. The impact may normally not be intense enough to cause an airbag deployment but is enough to be detected by other vibration sensors such as accelerometer, gyroscope, etc. Another way to "automatically" detect the impact is for the system to detect the uncommon maneuvers made by some car owners who go over speed bumps, typically driving very slowly and taking the bump with a 45 degrees angle. Such pattern can easily be spotted.

In an aspect, several different contextual features may be recorded when an impact with a raised feature is detected, where the contextual factors related to the vehicle impact may include a vehicle location, a vehicle heading, a timestamp, an impact intensity or a combination thereof.

Once data related to impact of a low-profile vehicle with a raised feature on the road is collected, the system may process this data for understanding and predicting potential impact locations.

For example, in an aspect, the system may apply map matching to match the location of such impact to determine where on the map the impact occurred.

In an aspect, the system may employ hierarchical clustering of recorded impact locations. A first level of clustering groups or first location bucket may be manually detected locations of impact and a second location bucket may represent automated detections. Automated reports may be trusted more than manual reports.

After the hierarchical clustering, the system may cluster detection locations in each bucket. Map matched detection locations in each bucket are then clustered to remove noise and to determine the actual location given several impacts around the same location. In an aspect, DB-SCAN clustering could be used at this stage with minPts=3 and eps=5 meters for the manual (first location) bucket. In an aspect, DB-SCAN clustering could be used at this stage with minPts=2 and eps=5 meters for the automated (second location) bucket. In an aspect, a cluster may require at least 3 detections for it to be valid. In an aspect, each cluster has a label to say whether the data came from manual or automated reports.

The system may then use the clustered data to make predictions of potential locations where low-profile vehicle impact with a raised feature of the road may occur. In an aspect, the system may use the collected data in one region as ground truth to train a machine learning model to automatically flag these locations in a map only if it is relevant to the driver's low-profile vehicle.

In an aspect, ground truth data may include "positive" observations of locations where the detections occur, including map features (e.g. slope, curvature, lane, functional class, road width, road grade, curb/no curb, pavement material, etc) and vehicle properties such as vehicle type/class, height, suspension properties, wheel properties such as height or a combination thereof.

Ground truth data may also include "negative" observations of locations where the detections did not occur including the map features (e.g. slope, curvature, lane, functional class, road width, road grade, curb/no curb, pavement material, etc) and vehicle properties such as vehicle type/class, height, suspension properties and/or wheel properties such as height.

Using the above data, one may train a machine learning model to predict the locations where these locations may present themselves with raised features of the road. Example of trained machine learning models may be random forest, decision trees, neural networks, etc.

The system may run the trained machine learning model. The trained machine learning model may be saved on a computer locally or in the cloud. The trained machine learning model may be run in a new area, or region the user would enter their car details to the model and the model would execute on the system map, and utilize transfer learning to leverage prior data. The trained machine learning model employing transfer learning may use content in a tile by tile manner.

In an aspect, several trained models may be stored and pass unique tile based map information to the model. In this instance, tile based map information is the same as what was collected in the training data.

In another aspect, the system may use other automated means of detecting potential risks for low-profile vehicles by observing and reporting the behaviors of all other vehicles, to determine potential risks. In an aspect, the candidate driver's vehicle's non-impact but other vehicles potential impact is recorded. For example, the candidate vehicle was not impacted but can still generate detection warnings specifically for other vehicles of different dimensions. Typically, any vehicle equipped with the relevant sensors could report: height of curbs; speed bumps heights and profiles; deep pot holes; how much the suspension lowered over an obstacle, etc. In an aspect, all this data can be used to generate a map of locations with potential associated risks.

In this location detection, some distances which are important to consider in the analysis include: distance between front of the vehicle and front wheels and/or distance between back of the vehicle and back wheels. The system can then use such "metrics" to categorize why this specific area was a problem for this vehicle. The profiling definition may be based on key categories. Then, vehicles can be warned "personally" based on the area and profiles.

The disclosed system may have applicability to other vehicles, and the system applied to a wider range of vehicles. Regular vehicles may also have such issues of hitting the curb, from the front or the rear. One typical example is the use of hitch ball on the rear of a vehicle. This part of the car could easily touch the curb, especially when the curb's height has been elevated due to a tree root around the location.

In another aspect, the system could leverage sensors on the vehicle such as Lidar to detect in real time that the vehicle is about to hit a bump or curb and make a recommendation to the driver.

FIG. 1 illustrates a schematic diagram of a network environment 100 of a system 102 for assisting an owner of a low-profile vehicle to avoid damages related to vehicle impact upon a raised feature of a road in accordance with an example aspect. The system 102 may be communicatively coupled with, a user equipment (UE) 104, an OEM cloud 106, a mapping platform 108, via a network 110. The UE 104 may be a vehicle electronics system, onboard automotive electronics/computers, a mobile device such as a smartphone, tablet, smart watch, smart glasses, laptop, wearable device or other UE platforms known to one of skill in the art. The mapping platform 108 may further include a server 108A and a database 108B. The user equipment includes an application 104A, a user interface 104B, and a sensor unit 104C. Further, the server 108A and the database 108B may be communicatively coupled to each other.

The system 102 may comprise suitable logic, circuitry, interfaces and code that may be configured to process the sensor data obtained from the UE 104 for point of interest features or weather conditions in a region of the intersection, that may be used to assist an owner of a low-profile vehicle to avoid damages related to vehicle impact upon a raised feature of a road. Such features can also include a vehicle location, a vehicle heading, a timestamp, an impact intensity or a combination thereof. Other features may include a slope of a road, a curvature of a road, lane dimensions, a road functional class, a road width, a road grade, presence of a curb and/or a pavement material; and the vehicle features comprise a vehicle class, a vehicle height, vehicle suspension properties and/or wheel dimensions.

The system 102 may be communicatively coupled to the UE 104, the OEM cloud 106, and the mapping platform 108 directly via the network 110. Additionally, or alternately, in some example aspects, the system 102 may be communicatively coupled to the UE 104 via the OEM cloud 106 which in turn may be accessible to the system 102 via the network 110.

All the components in the network environment 100 may be coupled directly or indirectly to the network 110. The components described in the network environment 100 may be further broken down into more than one component and/or combined together in any suitable arrangement. Further, one or more components may be rearranged, changed, added, and/or removed. Furthermore, fewer or additional components may be in communication with the system 102, within the scope of this disclosure.

The system 102 may be embodied in one or more of several ways as per the required implementation. For example, the system 102 may be embodied as a cloud-based service or a cloud-based platform. As such, the system 102 may be configured to operate outside the UE 104. However, in some example aspects, the system 102 may be embodied within the UE 104. In each of such aspects, the system 102 may be communicatively coupled to the components shown in FIG. 1 to carry out the desired operations and wherever required modifications may be possible within the scope of the present disclosure.

The UE 104 may be a vehicle electronics system, onboard automotive electronics/computers, a mobile device such as a smartphone, tablet, smart watch, smart glasses, laptop, wearable device and the like that is portable in itself or as a part of another portable/mobile object, such as, a vehicle known to one of skill in the art. The UE 104 may comprise a processor, a memory and a network interface. The processor, the memory and the network interface may be communicatively coupled to each other. In some example aspects, the UE 104 may be associated, coupled, or otherwise integrated with a vehicle of the user, such as an advanced driver assistance system (ADAS), a personal navigation device (PND), a portable navigation device, an infotainment system and/or other device that may be configured to provide route guidance and navigation related functions to the user. In such example aspects, the UE 104 may comprise processing means such as a central processing unit (CPU), storage means such as on-board read only memory (ROM) and random access memory (RAM), acoustic sensors such as a microphone array, position sensors such as a GPS sensor, gyroscope, a LIDAR sensor, a proximity sensor, motion sensors such as accelerometer, a display enabled user interface such as a touch screen display, and other components as may be required for specific functionalities of the UE 104. Additional, different, or fewer components may be provided. For example, the UE 104 may be configured to execute and run mobile applications such as a messaging application, a browser application, a navigation application, and the like. In accordance with an aspect, the UE 104 may be directly coupled to the system 102 via the network 110. For example, the UE 104 may be a dedicated vehicle (or a part thereof) for gathering data for development of the map data in the database 108B. In some example aspects, the UE 104 may be coupled to the system 102 via the OEM cloud 106 and the network 110. For example, the UE 104 may be a consumer mobile phone (or a part thereof) and may be a beneficiary of the services provided by the system 102. In some example aspects, the UE 104 may serve the dual purpose of a data gatherer and a beneficiary device. The UE 104 may be configured to provide sensor data to the system 102. In accordance with an aspect, the UE 104 may process the sensor data for information that may be used to assist an owner of a low-profile vehicle to avoid damages related to vehicle impact upon a raised feature of a road, such as detection of the vehicle impact with one or more sensors coupled to the vehicle. Further, in accordance with an aspect, the UE 104 may be configured to perform processing related to assisting an owner of a low-profile vehicle to avoid damages related to vehicle impact upon a raised feature of a road.

The UE 104 may include the application 104A with the user interface 104B to access one or more applications. The application 104B may correspond to, but not limited to, map related service application, navigation related service application and location-based service application. In other words, the UE 104 may include the application 104A with the user interface 104B. The user interface 104B may be a dedicated user interface configured to show potential low-profile vehicle impact locations with raised features. The user interface 104B may be in the form of a map depicting regions of high or low risk to assist an owner of a low-profile vehicle to avoid damages related to vehicle impact upon a raised feature of a road may provide according to aspects of the disclosure.

The sensor unit 104C may be embodied within the UE 104. The sensor unit 104C comprising one or more sensors may capture sensor data, in a certain geographic location. In accordance with an aspect, the sensor unit 104C may be built-in, or embedded into, or within interior of the UE 104. The one or more sensors (or sensors) of the sensor unit 104C may be configured to provide the sensor data comprising location data associated with a location of a user. In accordance with an aspect, the sensor unit 104C may be configured to transmit the sensor data to an Original Equipment Manufacturer (OEM) cloud. Examples of the sensors in the sensor unit 104C may include, but not limited to, a microphone, a camera, an acceleration sensor, a gyroscopic sensor, a LIDAR sensor, a proximity sensor, and a motion sensor.

The sensor data may refer to sensor data collected from a sensor unit 104C in the UE 104. In accordance with an aspect, the sensor data may be collected from a large number of mobile phones. In accordance with an aspect, the sensor data may refer to the point cloud data. The point cloud data may be a collection of data points defined by a given coordinates system. In a 3D coordinates system, for instance, the point cloud data may define the shape of some real or created physical objects. The point cloud data may be used to create 3D meshes and other models used in 3D modelling for various fields. In a 3D Cartesian coordinates system, a point is identified by three coordinates that, taken together, correlate to a precise point in space relative to a point of origin. The LIDAR point cloud data may include point measurements from real-world objects or photos for a point cloud data that may then be translated to a 3D mesh or NURBS or CAD model. In accordance with an aspect, the sensor data may be converted to units and ranges compatible with the system 102, to accurately receive the sensor data at the system 102. Additionally, or alternately, the sensor data of a UE 104 may correspond to movement data associated with a user of the user equipment. Without limitations, this may include motion data, position data, orientation data with respect to a reference and the like.

The mapping platform 108 may comprise suitable logic, circuitry, interfaces and code that may be configured to store map data associated with a geographic area in the region of interest related to raised features on the road, such as, for example, speed bumps, speed humps, speed tables, curbs, etc. The map data may include traffic features and include historical (or static) traffic features such as road layouts, pre-existing road networks, business, educational and recreational locations, POI locations, historical and real-time weather conditions in the region or a combination thereof. The server 108A of the mapping platform 108 may comprise processing means and communication means. For example, the processing means may comprise one or more processors configured to process requests received from the system 102 and/or the UE 104. The processing means may fetch map data from the database 108B and transmit the same to the system 102 and/or the UE 104 in a suitable format. In one or more example aspects, the mapping platform 108 may periodically communicate with the UE 104 via the processing means to update a local cache of the map data stored on the UE 104. Accordingly, in some example aspects, map data may also be stored on the UE 104 and may be updated based on periodic communication with the mapping platform 108.

In an aspect, the map data may include, and the database 108B of the mapping platform 108 may store real-time, dynamic data about road features to assist with a driving decision at an intersection. For example, real-time data may be collected for vehicle features of the owner of the low-profile vehicle and other vehicles, and map features related to raised features on the road, etc. Other data records may include computer code instructions and/or algorithms for executing a trained machine learning model that is capable of assisting an owner of a low-profile vehicle to avoid damages related to vehicle impact upon a raised feature of a road.

The database 108B of the mapping platform 108 may store map data of one or more geographic regions that may correspond to a city, a province, a country or of the entire world. The database 108B may store point cloud data collected from the UE 104. The database 108B may store data such as, but not limited to, node data, road segment data, link data, point of interest (POI) data, link identification information, and heading value records. The database 108B may also store cartographic data, routing data, and/or maneuvering data. According to some example aspects, the road segment data records may be links or segments representing roads, streets, or paths, as may be used in calculating a route or recorded route information for determination of one or more personalized routes. The node data may be end points corresponding to the respective links or segments of road segment data. The road link data and the node data may represent a road network, such as used by vehicles, cars, trucks, buses, motorcycles, and/or other entities for identifying location of building.

Optionally, the database 108B may contain path segment and node data records, such as shape points or other data that may represent raised features and vehicle speed control indications, links or areas in addition to or instead of the vehicle road record data. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The database 108B may also store data about the POIs and their respective locations in the POI records. The database 108B may additionally store data about places, such as cities, towns, or other communities, and other geographic features such as bodies of water, and mountain ranges. Such place or feature data can be part of the POI data or can be associated with POIs or POI data records (such as a data point used for displaying or representing a position of a city). In addition, the database 108B may include event data (e.g., traffic incidents, construction activities, scheduled events, unscheduled events, accidents, diversions etc.) associated with the POI data records or other records of the database 108B. Optionally or additionally, the database 108B may store 3D building maps data (3D map model of objects) of structures, topography and other visible features surrounding roads and streets, including raised features on the roads.

The database 108B may be a master map database stored in a format that facilitates updating, maintenance, and development. For example, the master map database or data in the master map database may be in an Oracle spatial format or other spatial format, such as for development or production purposes. The Oracle spatial format or development/production database may be compiled into a delivery format, such as a geographic data files (GDF) format. The data in the production and/or delivery formats may be compiled or further compiled to form geographic database products or databases, which may be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by the UE 104. The navigation-related functions may correspond to vehicle navigation, pedestrian navigation, or other types of navigation. The compilation to produce the end user databases may be performed by a party or entity separate from the map developer. For example, a customer of the map developer, such as a navigation device developer or other end user device developer, may perform compilation on a received map database in a delivery format to produce one or more compiled navigation databases.

As mentioned above, the database 108B may be a master geographic database, but in alternate aspects, the database 108B may be embodied as a client-side map database and may represent a compiled navigation database that may be used in or with end user devices (such as the UE 104) to provide navigation and/or map-related functions. In such a case, the database 108B may be downloaded or stored on the end user devices (such as the UE 104).

The network 110 may comprise suitable logic, circuitry, and interfaces that may be configured to provide a plurality of network ports and a plurality of communication channels for transmission and reception of data, such as the sensor data, map data from the database 108B, etc. Each network port may correspond to a virtual address (or a physical machine address) for transmission and reception of the communication data. For example, the virtual address may be an Internet Protocol Version 4 (IPv4) (or an IPv6 address) and the physical address may be a Media Access Control (MAC) address. The network 110 may be associated with an application layer for implementation of communication protocols based on one or more communication requests from at least one of the one or more communication devices. The communication data may be transmitted or received, via the communication protocols. Examples of such wired and wireless communication protocols may include, but are not limited to, Transmission Control Protocol and Internet Protocol (TCP/IP), User Datagram Protocol (UDP), Hypertext Transfer Protocol (HTTP), File Transfer Protocol (FTP), ZigBee, EDGE, infrared (IR), IEEE 802.11, 802.16, cellular communication protocols, and/or Bluetooth (BT) communication protocols.

Examples of the network 110 may include, but is not limited to a wireless channel, a wired channel, a combination of wireless and wired channel thereof. The wireless or wired channel may be associated with a network standard which may be defined by one of a Local Area Network (LAN), a Personal Area Network (PAN), a Wireless Local Area Network (WLAN), a Wireless Sensor Network (WSN), Wireless Area Network (WAN), Wireless Wide Area Network (WWAN), a Long Term Evolution (LTE) networks (for e.g. LTE-Advanced Pro), 5G New Radio networks, ITU-IMT 2020 networks, a plain old telephone service (POTS), and a Metropolitan Area Network (MAN). Additionally, the wired channel may be selected on the basis of bandwidth criteria. For example, an optical fiber channel may be used for a high bandwidth communication. Further, a coaxial cable-based or Ethernet-based communication channel may be used for moderate bandwidth communication.

The system, apparatus, method and computer program product described above may be any of a wide variety of computing devices and may be embodied by either the same or different computing devices. The system, apparatus, etc. may be embodied by a server, a computer workstation, a distributed network of computing devices, a personal computer or any other type of computing device. The system, apparatus, method and computer program product may be configured to determine a driving decision may similarly be embodied by the same or different server, computer workstation, distributed network of computing devices, personal computer, or other type of computing device.

Alternatively, the system, apparatus, method and computer program product may be embodied by a computing device on board a vehicle, such as a computer system of a vehicle, e.g., a computing device of a vehicle that supports safety-critical systems such as the powertrain (engine, transmission, electric drive motors, etc.), steering (e.g., steering assist or steer-by-wire), and/or braking (e.g., brake assist or brake-by-wire), a navigation system of a vehicle, a control system of a vehicle, an electronic control unit of a vehicle, an autonomous vehicle control system (e.g., an autonomous-driving control system) of a vehicle, a mapping system of a vehicle, an Advanced Driver Assistance System (ADAS) of a vehicle), or any other type of computing device carried by the vehicle. Still further, the apparatus may be embodied by a computing device of a driver or passenger on board the vehicle, such as a mobile terminal, e.g., a personal digital assistant (PDA), mobile telephone, smart phone, personal navigation device, smart watch, tablet computer, or any combination of the aforementioned and other types of portable computer devices.

FIG. 2 illustrates a block diagram 200 of the system 102, exemplarily illustrated in FIG. 1, for assisting an owner of a low-profile vehicle to avoid damages related to vehicle impact upon a raised feature of a road, in accordance with an example aspect. FIG. 2 is described in conjunction with elements from FIG. 1.

As shown in FIG. 2, the system 102 may comprise a processing means such as a processor 202, storage means such as a memory 204, a communication means, such as a network interface 206, an input/output (I/O) interface 208, and a machine learning model 210. The processor 202 may retrieve computer executable instructions that may be stored in the memory 204 for execution of the computer executable instructions. The system 102 may connect to the UE 104 via the I/O interface 208. The processor 202 may be communicatively coupled to the memory 204, the network interface 206, the I/O interface 208, and the machine learning model 210.

The processor 202 may comprise suitable logic, circuitry, and interfaces that may be configured to execute instructions stored in the memory 204. The processor 202 may obtain sensor data associated with vehicle impact data for the owner's low-profile vehicle or other vehicles on the road. The sensor data may be captured by one or more UE, such as the UE 104. The processor 202 may be configured to determine raised features in the region of navigation, based on the sensor data. The processor 202 may be further configured to determine, using a trained machine learning model in conjunction with ground truth of the region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

Examples of the processor 202 may be an Application-Specific Integrated Circuit (ASIC) processor, a Complex Instruction Set Computing (CISC) processor, a central processing unit (CPU), an Explicitly Parallel Instruction Computing (EPIC) processor, a Very Long Instruction Word (VLIW) processor, and/or other processors or circuits. The processor 202 may implement a number of processor technologies known in the art such as a machine learning model, a deep learning model, such as a recurrent neural network (RNN), a convolutional neural network (CNN), and a feed-forward neural network, or a Bayesian model. As such, in some aspects, the processor 202 may include one or more processing cores configured to perform independently. A multi-core processor may enable multiprocessing within a single physical package.

Additionally, or alternatively, the processor 202 may include one or more processors configured in tandem via the bus to enable independent execution of instructions, pipelining and/or multithreading. Additionally, or alternatively, the processor 202 may include one or processors capable of processing large volumes of workloads and operations to provide support for big data analysis. However, in some cases, the processor 202 may be a processor specific device (for example, a mobile terminal or a fixed computing device) configured to employ an aspect of the disclosure by further configuration of the processor 202 by instructions for performing the algorithms and/or operations described herein.

In some aspects, the processor 202 may be configured to provide Internet-of-Things (IoT) related capabilities to users of the UE 104 disclosed herein. The IoT related capabilities may in turn be used to provide smart city solutions by providing real time parking updates, big data analysis, and sensor-based data collection for providing navigation and parking recommendation services. The environment may be accessed using the I/O interface 208 of the system 102 disclosed herein.

The memory 204 may comprise suitable logic, circuitry, and interfaces that may be configured to store a machine code and/or instructions executable by the processor 202. The memory 204 may be configured to store information including processor instructions for training the machine learning model. The memory 204 may be used by the processor 202 to store temporary values during execution of processor instructions. The memory 204 may be configured to store different types of data, such as, but not limited to, sensor data from the UE 104. Examples of implementation of the memory 204 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The network interface 206 may comprise suitable logic, circuitry, and interfaces that may be configured to communicate with the components of the system 102 and other systems and devices in the network environment 100, via the network 110. The network interface 206 may communicate with the UE 104, via the network 110 under the control of the processor 202. In one aspect, the network interface 206 may be configured to communicate with the sensor unit 104C disclosed in the detailed description of FIG. 1. In an alternative aspect, the network interface 206 may be configured to receive the sensor data from the OEM cloud 106 over the network 110 as described in FIG. 1. In some example aspects, the network interface 206 may be configured to receive location information of a user associated with a UE (such as, the UE 104), via the network 110. In accordance with an aspect, a controller of the UE 104 may receive the sensor data from a positioning system (for example: a GPS based positioning system) of the UE 104. The network interface 206 may be implemented by use of known technologies to support wired or wireless communication of the system 102 with the network 110. Components of the network interface 206 may include, but are not limited to, an antenna, a radio frequency (RF) transceiver, one or more amplifiers, a tuner, one or more oscillators, a digital signal processor, a coder-decoder (CODEC) chipset, a subscriber identity module (SIM) card, and/or a local buffer circuit.

The I/O interface 208 may comprise suitable logic, circuitry, and interfaces that may be configured to operate as an I/O channel/interface between the UE 104 and different operational components of the system 102 or other devices in the network environment 100. The I/O interface 208 may facilitate an I/O device (for example, an I/O console) to receive an input (e.g., sensor data from the UE 104 for a time duration) and present an output to one or more UE (such as, the UE 104) based on the received input. In accordance with an aspect, the I/O interface 208 may obtain the sensor data from the OEM cloud 106 to store in the memory 202. The I/O interface 208 may include various input and output ports to connect various I/O devices that may communicate with different operational components of the system 102. In accordance with an aspect, the I/O interface 208 may be configured to output the personalized planning recommendation(s) to a user device, such as, the UE 104 of FIG.1.

In example aspects, the I/O interface 208 may be configured to provide the data associated with assisting an owner of a low-profile vehicle to avoid damages related to vehicle impact upon a raised feature of a road to the database 108A to update the map of a certain geographic region. In accordance with an aspect, a user requesting information in a geographic region may be updated about historical (or static) road features, real-time or historical weather conditions at the intersection, point-of-interest opening times around the intersection, etc. Examples of the input devices may include, but are not limited to, a touch screen, a keyboard, a mouse, a joystick, a microphone, and an image-capture device. Examples of the output devices may include, but are not limited to, a display, a speaker, a haptic output device or other sensory output devices.

In accordance with an aspect, the processor 202 may train the machine learning model 210 to assist an owner of a low-profile vehicle to avoid damages related to vehicle impact upon a raised feature of a road. In an aspect of the disclosure, the processor 202 may predict, based on the trained machine learning model in conjunction with ground truth of the region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties. In an aspect, a weighted linear regression model may be used to predict, based on the trained machine learning model in conjunction with ground truth of the region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties. In another aspect, a look-up table for predicting, based on the trained machine learning model in conjunction with ground truth of the region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties may be used, where the look-up table is populated with entries of prior low-profile vehicle impacts in the region.

In another aspect, a machine learning model, such as trained machine learning model 210 discussed earlier, may be used to assist an owner of a low-profile vehicle to avoid damages related to vehicle impact upon a raised feature of a road. In accordance with an aspect, the trained machine learning model 210 may be trained offline to obtain a classifier model to automatically predict, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties. For the training of the trained machine learning model 210, different feature selection techniques and classification techniques may be used. The system 102 may be configured to obtain the trained machine learning model 210 and the trained machine learning model 210 model may leverage historical information and real-time data to automatically predict, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties. In addition to this historical data, the system 102 may put more weight on real-time information for the trained machine learning model 210, captured by sensors but also data available from other parameters that influence the likelihood of a low-profile vehicle impact with raised features on the road. In one aspect, supervised machine learning techniques may be utilized where ground truth data is used to train the model for different scenarios and then in areas where there is not sufficient ground truth data, the trained machine learning model 210 can be used to predict features or results.

In an aspect, the trained machine learning model 210 may be complemented or substituted with a transfer learning model. The transfer learning model may be used when the contextual factors related to the vehicle impact, such as, a vehicle location, a vehicle heading, a timestamp, an impact intensity are unavailable, sparse, incomplete, corrupted or otherwise unreliable for assisting an owner of a low-profile vehicle to avoid damages related to vehicle impact upon a raised feature of a road. The transfer learning model may then use historical vehicle location, vehicle headings, timestamps, impact intensities, slope of a road, a curvature of a road, lane dimensions, a road functional class, a road width, a road grade, presence of a curb and/or a pavement material; and the vehicle features comprise a vehicle class, a vehicle height, vehicle suspension properties and/or wheel dimensions, etc., for assisting an owner of a low-profile vehicle to avoid damages related to vehicle impact upon a raised feature of a road.

In accordance with an aspect, various data sources may provide the historical and real-time information on vehicle features, map features and impact location information as an input to the machine learning model 210. Examples of the machine learning model 210 may include, but not limited to, Decision Tree (DT), Random Forest, and Ada Boost. In accordance with an aspect, the memory 204 may include processing instructions for training of the machine learning model 210 with data set that may be real-time (or near real time) data or historical data. In accordance with an aspect, the data may be obtained from one or more service providers.

FIG. 3 illustrates an example map or geographic database 307, which may include various types of geographic data 340. The database may be similar to or an example of the database 108B. The data 340 may include but is not limited to node data 342, road segment or link data 344, map object and point of interest (POI) data 346, low-profile vehicle impact data records 348, or the like (e.g., other data records 350 such as traffic data, sidewalk data, road dimension data, building dimension data, vehicle dimension/turning radius data, etc.). Other data records may include computer code instructions and/or algorithms for executing a trained machine learning model that is capable of assisting an owner of a low-profile vehicle to avoid damages related to vehicle impact upon a raised feature of a road.

A profile of end user mobility graph and personal activity information may be obtained by any functional manner including those detailed in U.S. Pat. Nos. 9,766,625 and 9,514,651, both of which are incorporated herein by reference. This data may be stored in one of more of the databases discussed above including as part of the low-profile vehicle impact data records 348 in some aspects. This data may also be stored elsewhere and supplied to the system 102 via any functional means.

In one aspect, the following terminology applies to the representation of geographic features in the database 307. A "Node"—is a point that terminates a link, a "road/line segment"—is a straight line connecting two points., and a "Link" (or "edge") is a contiguous, non-branching string of one or more road segments terminating in a node at each end. In one aspect, the geographic database 307 follows certain conventions. For example, links do not cross themselves and do not cross each other except at a node. Also, there are no duplicated shape points, nodes, or links. Two links that connect each other have a common node.

The geographic database 307 may also include cartographic data, routing data, and/or maneuvering data as well as indexes 352. According to some example aspects, the road segment data records may be links or segments representing roads, streets, or paths, as may be used in calculating a route or recorded route information for determination of one or more personalized routes. The node data may be end points (e.g., intersections) corresponding to the respective links or segments of road segment data. The road link data and the node data may represent a road network, such as used by vehicles, cars, trucks, buses, motorcycles, bikes, scooters, and/or other entities.

Optionally, the geographic database 307 may contain path segment and node data records or other data that may represent pedestrian paths or areas in addition to or instead of the vehicle road record data, for example. The road/link segments and nodes can be associated with attributes, such as geographic coordinates, street names, address ranges, speed limits, turn restrictions at intersections, and other navigation related attributes, as well as POIs, such as fueling stations, hotels, restaurants, museums, stadiums, offices, auto repair shops, buildings, stores, parks, etc. The geographic database 307 can include data about the POIs and their respective locations in the POI records. The geographic database 307 may include data about places, such as cities, towns, or other communities, and other geographic features such as bodies of water, mountain ranges, etc. Such place or feature data can be part of the POI data or can be associated with POIs or POI data records (such as a data point used for displaying or representing a position of a city). In addition, the map database can include event data (e.g., traffic incidents, construction activities, scheduled events, unscheduled events, etc.) associated with the POI data records or other records of the map database.

The geographic database 107 may be maintained by a content provider e.g., the map data service provider and may be accessed, for example, by the content or service provider processing server. By way of example, the map data service provider can collect geographic data and dynamic data to generate and enhance the map database and dynamic data such as weather- and traffic-related data contained therein. There can be different ways used by the map developer to collect data. These ways can include obtaining data from other sources, such as municipalities or respective geographic authorities, such as via global information system databases. In addition, the map developer can employ field personnel to travel by vehicle along roads throughout the geographic region to observe features and/or record information about them, for example. Also, remote sensing, such as aerial or satellite photography and/or LiDAR, can be used to generate map geometries directly or through machine learning as described herein. However, the most ubiquitous form of data that may be available is vehicle data provided by vehicles, such as mobile device, as they travel the roads throughout a region.

The geographic database 307 may be a master map database, such as an HD map database, stored in a format that facilitates updates, maintenance, and development. For example, the master map database or data in the master map database can be in an Oracle spatial format or other spatial format (e.g., accommodating different map layers), such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data may be compiled (such as into a platform specification format (PSF) format) to organize and/or configure the data for performing navigation-related functions and/or services, such as route calculation, route guidance, map display, speed calculation, distance and travel time functions, and other functions, by a navigation device, such as by a vehicle represented by mobile device, for example. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received map database in a delivery format to produce one or more compiled navigation databases.

As mentioned above, the geographic database 307 may be a master geographic database, but in alternate aspects, a client-side map database may represent a compiled navigation database that may be used in or with end user devices to provide navigation and/or map-related functions. For example, the map database may be used with the mobile device to provide an end user with navigation features. In such a case, the map database can be downloaded or stored on the end user device which can access the map database through a wireless or wired connection, such as via a processing server and/or a network, for example.

The records for low-profile vehicle impact data records 348 may include various points of data such as, but not limited to: regional and local historical low-profile vehicle impact data, presence of raised features on roads in the region, construction relating to raised features, etc.

FIG. 4 illustrates a flowchart 400 for acts taken in an exemplary method for assisting an owner of a low-profile vehicle to avoid damages related to vehicle impact upon a raised feature of a road, in accordance with an aspect. More, fewer or different steps may be provided. FIG. 4 is explained in conjunction with FIG. 1 to FIG. 3. The control starts at act 402.

At act 402, one or more locations of a vehicle impact upon the raised feature by detecting an occurrence of the vehicle impact and recording contextual factors related to the vehicle impact upon the raised feature is obtained. In an aspect, the contextual factors related to the vehicle impact comprise a vehicle location, a vehicle heading, a timestamp, an impact intensity or a combination thereof.

At act 404, the one or more obtained locations are clustered into a first location bucket defined by a manual detection of the vehicle impact and a second location bucket defined by an automatic detection of the vehicle impact. In an aspect, the manual detection of the vehicle impact comprises manual input of a record of the vehicle impact by the owner on a mobile device, and the automatic detection of the vehicle impact comprises detection of the vehicle impact with one or more sensors coupled to the vehicle. In a further aspect, the automatic detection of the vehicle impact further comprises a detection of a different vehicle executing an unusual maneuver near the raised feature of the road.

At act 406, the one or more locations related to the first location bucket and the second location bucket are matched to one or more map locations.

At act 408, the one or more matched locations are clustered using DB-SCAN clustering of the first location bucket and the second location bucket to remove noise associated with the one or more matched locations and to determine an actual location of the raised feature given a plurality of impacts around a same location.

As used in the present disclosure, and without limitation, density-based spatial clustering of applications with noise (DBSCAN) is a data clustering algorithm. It is a density-based clustering non-parametric algorithm, where given a set of points in some space, it groups together points that are closely packed together (points with many nearby neighbors), marking as outliers points that lie alone in low-density regions (whose nearest neighbors are too far away). DBSCAN requires two parameters: ε (eps) and the minimum number of points required to form a dense region[a] (minPts). The algorithm starts with an arbitrary starting point that has not been visited. This point's ε-neighborhood is retrieved, and if it contains sufficiently many points, a cluster is started. Otherwise, the point is labeled as noise. This point might later be found in a sufficiently sized ε-environment of a different point and hence be made part of a cluster.

In an aspect of the disclosure, the DB-SCAN clustering of the first location bucket comprises clustering with minPts=3 and eps=5 meters; and the DB-SCAN clustering of the second location bucket comprises clustering with minPts=2 and eps=3 meters.

At act 410, the system 102 may automatically predict, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties. In an aspect, the map features may include a slope of a road, a curvature of a road, lane dimensions, a road functional class, a road width, a road grade, presence of a curb and/or a pavement material, etc. In a further aspect, the vehicle features may include a vehicle class, a vehicle height, vehicle suspension properties and/or wheel dimensions, etc.

In an aspect, the system 102 may use transfer learning with the trained machine learning model in a new region in a tile by tile manner. In an aspect, the system 102 may display, on a user interface 104B, the one or more potential locations of vehicle impact on a map; provide routing instructions to avoid the one or more potential locations of vehicle impact in the region; and/or provide guidance on safely approaching the one or more potential locations of vehicle impact in the region.

In another aspect, the system 102 may use other automated means of detecting potential risks for low-profile vehicles by observing and reporting the behaviors of all other vehicles, to determine potential risks. In an aspect, the candidate driver's vehicle's non-impact but other vehicles potential impact is recorded. For example, the candidate vehicle was not impacted but can still generate detection warnings specifically for other vehicles of different dimensions. Typically, any vehicle equipped with the relevant sensors could report: height of curbs; speed bumps heights and profiles; deep pot holes; how much the suspension lowered over an obstacle, etc. In an aspect, all this data can be used to generate a map of locations with potential associated risks.

In this location detection, some distances which are important to consider in the analysis include: distance between front of the vehicle and front wheels and/or distance between back of the vehicle and back wheels. The system 102 can then use such "metrics" to categorize why this specific area was a problem for this vehicle. The profiling definition may be based on key categories. Then, vehicles can be warned "personally" based on the area and profiles.

The disclosed system 102 may have applicability to other vehicles, and the system applied to a wider range of vehicles. Regular vehicles may also have such issues of hitting the curb, from the front or the rear. One typical example is the use of hitch ball on the rear of a vehicle. This part of the car could easily touch the curb, especially when the curb's height has been elevated due to a tree root around the location.

In another aspect, the system 102 could leverage sensors on the vehicle such as Lidar to detect in real time that the vehicle is about to hit a bump, curb or other raised feature and make a recommendation to the driver.

The system 102 may have many applications. In an aspect, for example, the user interface 104B may allow a user to visualize on a generated map all speed bumps, humps, curbs and other relevant raised features on the road. In another aspect, the user interface 104B may display all curbs higher than a threshold relevant for vertical and oblique parking.

In an aspect, the system 102 may provide routing advice and guidance, such as avoiding bumps and other raised features; penalizing links on the map with such raised features; and/or route to a parking spot suitable for the user's low-profile vehicle.

In an aspect, the system 102 may provide guidance to a driver or AV, such as: warning users about detected dangers on the road or when parking; and/or show users how to pass a speed bump using an augmented reality (AR) overlay.

Blocks of the flowchart 500 support combinations of means for performing the specified functions and combinations of operations for performing the specified functions for performing the specified functions. It will also be understood that one or more blocks of the flowchart 500, and combinations of blocks in the flowchart 500, can be implemented by special purpose hardware-based computer systems which perform the specified functions, or combinations of special purpose hardware and computer instructions.

Alternatively, the system may comprise means for performing each of the operations described above. In this regard, according to an example aspect, examples of means for performing operations may comprise, for example, the processor 202 and/or a device or circuit for executing instructions or executing an algorithm for processing information as described above.

Although the aforesaid description of FIGS. 1-4 is provided with reference to the sensor data, however, it may be understood that the disclosure would work in a similar manner for different types and sets of data as well. The system 102 may generate/train the machine learning model 210 to evaluate different sets of data at various geographic locations. Additionally, or optionally, the determined personalized planning recommendation may be provided to an end user, as an update which may be downloaded from the mapping platform 110. The update may be provided as a run time update or a pushed update.

It will be understood that each block of the flowcharts and combination of blocks in the flowcharts may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory device 14 of an apparatus 10 employing an aspect of the present disclosure and executed by the processing circuitry 12. As will be appreciated, any such computer program instructions may be loaded onto a computer or other programmable apparatus (for example, hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, can be implemented by special purpose hardware-based computer systems which perform the specified functions, or combinations of special purpose hardware and computer instructions.

Many modifications and other aspects of the disclosures set forth herein will come to mind to one skilled in the art to which these disclosures pertain having the benefit of the teachings presented in the foregoing descriptions and the associated drawings. Therefore, it is to be understood that the disclosures are not to be limited to the specific aspects disclosed and that modifications and other aspects are intended to be included within the scope of the appended claims. Furthermore, in some aspects, additional optional operations may be included. Modifications, additions, or amplifications to the operations above may be performed in any order and in any combination.

Moreover, although the foregoing descriptions and the associated drawings describe example aspects in the context of certain example combinations of elements and/or functions, it should be appreciated that different combinations of elements and/or functions may be provided by alternative aspects without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

What is claimed is:

1. A system to assist an owner of a low-profile vehicle to avoid damages related to vehicle impact upon a raised feature of a road, the system comprising:
    at least one memory configured to store computer executable instructions; and
    at least one processor configured to execute the computer executable instructions to:
        obtain one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact;
        match the one or more locations related to the first location bucket and the second location bucket to one or more map locations;
        cluster the one or more matched locations using DB-SCAN clustering of the first location bucket and the second location bucket to remove noise associated with the one or more matched locations and to determine an actual location of the raised feature given a plurality of impacts around a same location; and
        automatically predict, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

2. The system of claim 1, where the manual detection of the vehicle impact comprises manual input of a record of the vehicle impact by the owner on a mobile device, and the automatic detection of the vehicle impact comprises detection of the vehicle impact with one or more sensors coupled to the vehicle.

3. The system of claim 2, where the automatic detection of the vehicle impact further comprises a detection of a different vehicle executing an unusual maneuver near the raised feature of the road.

4. The system of claim 1, where the contextual factors related to the vehicle impact comprise a vehicle location, a vehicle heading, a timestamp, an impact intensity or a combination thereof.

5. The system of claim 1, where the DB-SCAN clustering of the first location bucket comprises clustering with minPts=3 and eps=5 meters; and the DB-SCAN clustering of the second location bucket comprises clustering with minPts=2 and eps=3 meters.

6. The system of claim 1, where the map features comprise a slope of a road, a curvature of a road, lane dimensions, a road functional class, a road width, a road grade, presence of a curb and/or a pavement material; and the vehicle features comprise a vehicle class, a vehicle height, vehicle suspension properties and/or wheel dimensions.

7. The system of claim 1, where the computer readable instructions to automatically predict, using the trained machine learning model trained on ground truth of the region comprise computer readable instructions to use transfer learning with the trained machine learning model in a new region in a tile by tile manner.

8. The system of claim 1, further comprising computer readable instructions to: display the one or more potential locations of vehicle impact on a map; provide routing instructions to avoid the one or more potential locations of vehicle impact in the region; and/or provide guidance on safely approaching the one or more potential locations of vehicle impact in the region.

9. A computer-implemented method to assist an owner of a low-profile vehicle to avoid damages related to vehicle impact upon a raised feature of a road, the method comprising:
    obtaining one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact;

matching the one or more locations related to the first location bucket and the second location bucket to one or more map locations;

clustering the one or more matched locations using DB-SCAN clustering of the first location bucket and the second location bucket to remove noise associated with the one or more matched locations and to determine an actual location of the raised feature given a plurality of impacts around a same location; and automatically predicting, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

10. The method of claim 9, where the manual detection of the vehicle impact comprises manual input of a record of the vehicle impact by the owner on a mobile device, and the automatic detection of the vehicle impact comprises detection of the vehicle impact with one or more sensors coupled to the vehicle.

11. The method of claim 10, where the automatic detection of the vehicle impact further comprises a detection of a different vehicle executing an unusual maneuver near the raised feature of the road.

12. The method of claim 9, where the contextual factors related to the vehicle impact comprise a vehicle location, a vehicle heading, a timestamp, an impact intensity or a combination thereof.

13. The method of claim 9, where the DB-SCAN clustering of the first location bucket comprises clustering with minPts=3 and eps=5 meters; and the DB-SCAN clustering of the second location bucket comprises clustering with minPts=2 and eps=3 meters.

14. The method of claim 9, where the map features comprise a slope of a road, a curvature of a road, lane dimensions, a road functional class, a road width, a road grade, presence of a curb and/or a pavement material; and the vehicle features comprise a vehicle class, a vehicle height, vehicle suspension properties and/or wheel dimensions.

15. The method of claim 9, where automatically predicting, using the trained machine learning model trained on ground truth of the region comprises using transfer learning with the trained machine learning model in a new region in a tile by tile manner.

16. The method of claim 9, further comprising: displaying the one or more potential locations of vehicle impact on a map; providing routing instructions to avoid the one or more potential locations of vehicle impact in the region; and/or providing guidance on safely approaching the one or more potential locations of vehicle impact in the region.

17. A computer program product comprising a non-transitory computer readable medium having stored thereon computer executable instructions, which when executed by one or more processors, cause the one or more processors to carry out operations to assist an owner of a low-profile vehicle to avoid damages related to vehicle impact upon a raised feature of a road, the operations comprising:

obtaining one or more locations of a vehicle impact upon the raised feature by detecting an occurrence of the vehicle impact and recording contextual factors related to the vehicle impact upon the raised feature, where the one or more obtained locations are clustered into a first location bucket defined by a manual detection of the vehicle impact and a second location bucket defined by an automatic detection of the vehicle impact;

matching the one or more locations related to the first location bucket and the second location bucket to one or more map locations;

clustering the one or more matched locations using DB-SCAN clustering of the first location bucket and the second location bucket to remove noise associated with the one or more matched locations and to determine an actual location of the raised feature given a plurality of impacts around a same location; and automatically predicting, using a trained machine learning model trained on ground truth of a region, one or more potential locations of vehicle impact relevant to the owner of the low-profile vehicle, where the ground truth of a region comprises positive observations of locations where the detected occurrences of the vehicle impact occur including map features and vehicle properties and negative observations of locations where no detected occurrences of the vehicle impact occur including map features and vehicle properties.

18. The computer program product of claim 17, where the manual detection of the vehicle impact comprises manual input of a record of the vehicle impact by the owner on a mobile device, and the automatic detection of the vehicle impact comprises detection of the vehicle impact with one or more sensors coupled to the vehicle.

19. The computer program product of claim 17, where automatically predicting, using the trained machine learning model trained on ground truth of the region comprises using transfer learning with the trained machine learning model in a new region in a tile by tile manner.

20. The computer program product of claim 17, further comprising: displaying the one or more potential locations of vehicle impact on a map; providing routing instructions to avoid the one or more potential locations of vehicle impact in the region; and/or providing guidance on safely approaching the one or more potential locations of vehicle impact in the region.

* * * * *